US008813640B2

(12) United States Patent
Wong

(10) Patent No.: US 8,813,640 B2
(45) Date of Patent: Aug. 26, 2014

(54) VEGETABLE AND FRUIT CUTTING DEVICE

(76) Inventor: Yan Kwong Wong, Hong Kong (CN)

( * ) Notice: Subject to any disclaimer, the term of this patent is extended or adjusted under 35 U.S.C. 154(b) by 969 days.

(21) Appl. No.: 12/916,587

(22) Filed: Oct. 31, 2010

(65) Prior Publication Data

US 2011/0154998 A1 Jun. 30, 2011

(30) Foreign Application Priority Data

Dec. 31, 2009 (CN) .......................... 2009 2 0296852

(51) Int. Cl.
*A23N 4/04* (2006.01)
*A47J 17/00* (2006.01)
*B26D 1/02* (2006.01)
*B26D 3/28* (2006.01)

(52) U.S. Cl.
CPC . *B26D 3/283* (2013.01); *B62D 7/01* (2013.01)
USPC .................................. 99/537; 83/856; 83/858

(58) Field of Classification Search
USPC ........... 99/537, 543, 545; 83/425, 425.3, 697, 83/856, 858, 932, 431, 857
See application file for complete search history.

(56) References Cited

U.S. PATENT DOCUMENTS

2004/0231482 A1* 11/2004 Boilen ......................... 83/425.3
2007/0137457 A1* 6/2007 Botsai et al. .................... 83/858
2008/0098866 A1* 5/2008 DiPietro ...................... 83/440.2

* cited by examiner

*Primary Examiner* — Dana Ross
*Assistant Examiner* — Lindsey C Teaters
(74) *Attorney, Agent, or Firm* — Global IP Services; Tianhua Gu

(57) ABSTRACT

A vegetable and fruit cutting device having a rack; a slide-rail adapted for moving vertically mounted on the rack; a platform mounted on the slide-rail; a serrated-blade assembly; a flat-blade assembly; and an escalating device adapted for adjusting vertical movement of the platform. The escalating device having an eccentric cam assembly mounted below the platform and a knob adapted for driving the eccentric cam assembly mounted to the side of the body. The eccentric cam assembly having a shaft mounted between the top of the rack and the bottom of the platform, the shaft having an eccentric cam which is fixed to the shaft. The serrated-blade assembly is mounted to the bottom of the platform. And the platform has a second aperture for receiving a serrated-blade of the serrated-blade assembly.

13 Claims, 10 Drawing Sheets

VEGETABLE AND FRUIT CUTTING DEVICE

CROSS REFERENCE TO RELATED PATENT APPLICATION

The present application claims the priority of Chinese patent application No. 200920296852.4 filed on Dec. 31, 2009, which application is incorporated herein by reference.

BACKGROUND OF TH INVENTION

1. Field of the Invention

The present invention relates to a vegetable and fruit processing device, and more particularly to a vegetable and fruit cutting device with a platform which can be adjustable.

2. Description of the Related Art

Vegetable and fruit cutting device is mainly a device having vertical blades and horizontal blades. When vegetable or fruit passes through the device, blades thereof may cut vegetables or fruits into strips or slices.

The common vegetable and fruit cutting device in the market is generally classified into two types. One type of the device is connecting a handle with a row of balanced blades, it exerts force downwardly from the top end of the vegetable or the fruit, and the vegetable or the fruit will be cut into slices by the blades. Then the device rotates about 90 degrees to the left or the right, and by repeating the above cutting process, the vegetable or the fruit will then be cut into strips. However, this type of device has two disadvantages. One is that the user is required to perform repeated actions of vertical cutting process to cut the vegetable or the fruit into strips, the other is that the user is not able to control the thickness of finished products.

Another type of the device comprises a slide-rail, a serrated-blade assembly and a flat-blade assembly disposed on the slide-rail. This device has a slide-rail that may move up or down in order to adjust the height thereof, thus the thicknesses of the slices or the strips of the vegetable or the fruit can be controlled by adjusting the height of the slide-rail. However, based on the existing technology, the above structure of the slide-rail is complicated and the manufacturing cost is comparatively high. Furthermore, it is easy to be blocked and therefore it is also unreliable in using.

SUMMARY OF THE INVENTION

The present invention relates to a vegetable and fruit cutting device which is reliable in use and has a simple structure to solve the problem of the high manufacturing cost and being unreliable in use of the conventional vegetable and fruit cutting device.

A vegetable and fruit cutting device in accordance with an exemplary embodiment of the present invention, comprises:

a rack;

a slide-rail mounted on the rack and adapted for moving vertically;

a platform mounted on the slide-rail;

a serrated-blade assembly;

a flat-blade assembly; and an escalating device adapted for adjusting the vertical movement of the platform;

wherein the escalating device includes an eccentric cam assembly mounted below the platform, and a knob mounted on one side of the rack that adapted for driving the eccentric cam assembly, an active aperture is positioned below the platform for the lifting of the platform; the eccentric cam assembly includes a controlling shaft under the platform and rotatably mounted on the rack, an eccentric cam fixed on the controlling shaft and matching with the active aperture; the serrated-blade assembly is rotatably set under the platform, and a blade aperture for receiving the serrated-blade of the serrated-blade assembly is provided on the platform.

Typically, in the vegetable and fruit cutting device, two opposite active apertures are positioned below the platform, and the controlling shaft has two eccentric cams that corresponding to the two opposite active apertures.

Typically, in the vegetable and fruit cutting device, the escalating device includes two sets of eccentric cam assembly, a synchronizer is provided between the two sets of eccentric cam assembly, and the synchronizer has two synchronized gears disposed at a same end of two controlling shafts of the two eccentric cam assemblies, and a gear rack engaged with the two synchronized gears is provided on the rack.

Typically, in the vegetable and fruit cutting device, a position device is mounted between the knob and the controlling shaft, the positioning device includes a driven gear mounted on a side of an end face of the knob, a fixed gear mounted on the rack, a first spring sleeved on an end of the controlling shaft which is projecting from the rack, and a first fixed bolt for securing the first spring between the knob and the end of the controlling shaft.

Typically, in the vegetable and fruit cutting device, the serrated-blade assembly includes a blade device rotatably provided on the rack, and a blade knob provided on an end of the blade device for controlling the rotation of the blade device.

Typically, in the vegetable and fruit cutting device, the blade device includes a blade connecting shaft rotatably set on the rack and one end of the connecting shaft which is projecting from a side of the rack, and a blade assembly provided on the blade connecting shaft; the blade knob is sleeved on an end of the connecting shaft which is projecting from the rack.

Typically, in the vegetable and fruit cutting device, an axial installing slot is provided on a side of the blade connecting shaft, the blade assembly includes a serrated-blade base that matching with the axial installing slot, and a plurality of serrated-blades radially provided on one side of the serrated-blade base along the blade connecting shaft; the serrated-blade is matching with the second aperture of the platform.

Typically, in the vegetable and fruit cutting device, at least two sets of blade assembly are provided on the blade connecting shaft, and a blade-replacing positioning device is provided between the blade knob and the rack, the blade-replacing positioning device is adapted for securing the blade connecting shaft so that one set of the blade assembly is passing through the blade aperture to extend to the upside of the platform.

Typically, in the vegetable and fruit cutting device, the blade connecting shaft is rotatably mounted on the rack through a shaft aperture, the blade-replacing positioning device includes a positioning convex provided on a side of end face of the blade knob that corresponding to the position that blade assembly mounted on the blade connecting shaft, at least one positioning slot that matching with the positioning convex is provided around the shaft aperture, a second spring sleeved on an end of the blade connecting shaft which is projecting from the rack, and a second fixed bolt for securing the second spring between the blade knob and the end of the connecting shaft.

Typically, in the vegetable and fruit cutting device, the rack includes a body and a foot assembly that rotatably mounted on the bottom of the back-end of the body, at least one foot support is provided on the bottom of the back-end of the body;

the foot assembly includes a foot body and a locking device for rotatably connecting the foot body with the foot support.

Typically, in the vegetable and fruit cutting device, two foot shaft apertures are symmetrically set on the foot support, and two foot locking holes are set on the foot body that corresponding with the two foot shaft apertures, one set of the locking device is provided related to the foot shaft aperture and foot locking hole; the locking device includes a cylinder, an elongated foot lock adapted to pass through the foot shaft aperture and foot locking hole, and a foot locking cover fastened on the elongated foot lock.

Typically, in the vegetable and fruit cutting device, a foot positioning device for securing the foot assembly with predetermined angle is provided between the foot assembly and the rack, the foot positioning device includes an elastic bulge and a retaining nest that provided between the cylinder and the side walls of the foot shaft aperture and the foot locking hole.

Typically, in the vegetable and fruit cutting device, a concave member adapted for receiving the opening of a container for storing the cut vegetable or fruit is positioned below the rack body and the foot body.

Typically, in the vegetable and fruit cutting device, a cover for protecting the serrated-blade assembly is rotatably set on the bottom of the rack and under the serrated-blade assembly.

The vegetable and fruit cutting device of the present invention has the following advantages. Since the rack includes the eccentric cam assembly and the knob, and the eccentric cam assembly comprises the controlling shaft rotatably disposed under the moveable platform of the rack, the knob rotates to drive the controlling shaft to rotate, thus the platform moves up or down to adjust the location of the platform relative to the serrated-blade assembly for controlling the thickness of the cut vegetable or the cut fruit. Since the present invention moves up or down the platform by the rotation of the eccentric cam assembly, the whole structure is simple, and the manufacturing cost is low. At this moment, since the location of the platform is mainly relative to the relative location of the eccentric cam in the platform active hole, and the eccentric cam is not blocked in the active hole, the whole device is reliable in use and can undertake a large pressure, thus the whole device has a long lifetime.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF THE INVENTION

Reference will now be made to the drawings to describe exemplary embodiments of the present vegetable and fruit cutting device in detail. The following description is given by way of example, and not limitation.

Figure 1:
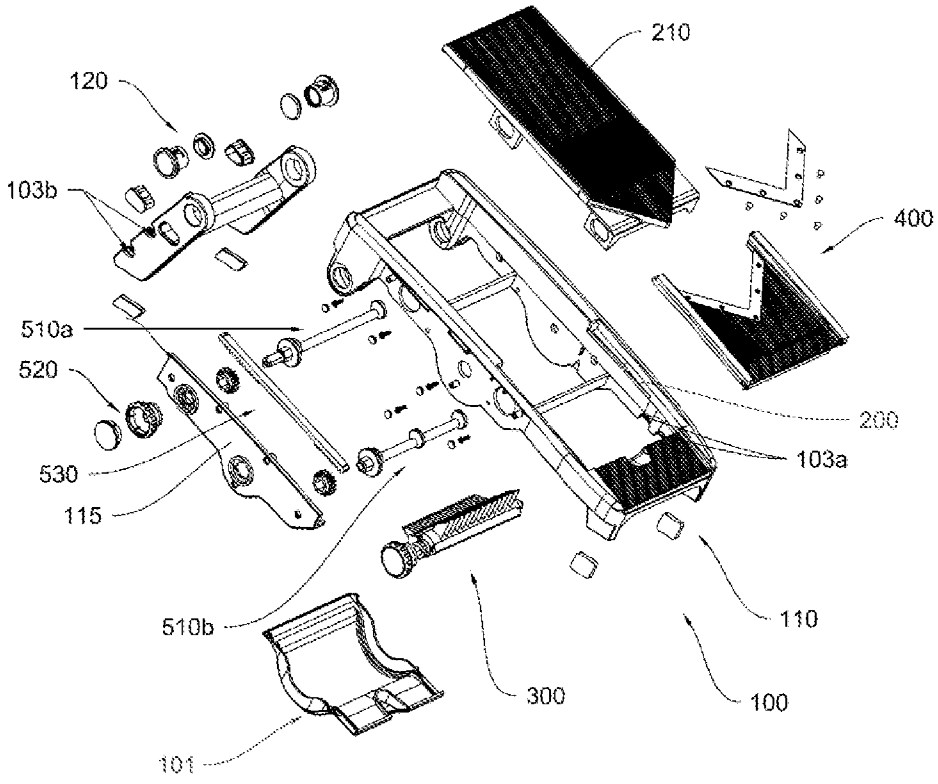
FIG. 1 is an exploded schematic view of a vegetable and fruit cutting device according to a preferred embodiment of the present invention.

As shown in FIG. 1, a vegetable and fruit cutting device in accordance with an exemplary embodiment of the pressing invention, comprises a rack 100, a slide-rail 200 on the rack 100, a serrated-blade assembly 300 and a flat-blade assembly 400. When the vegetable or the fruit slides along the slide-rail 200, the serrated-blade assembly 300 and the flat-blade assembly 400 will cut the vegetable or the fruit into strips. When the flat-blade assembly 400 is only used, the vegetable or the fruit will be cut into slices.

As shown in FIGS. 1, 2, 2*a* and 3, the rack 100 comprises a body 110 and a foot assembly 120 arranged at the bottom of the body 110. Typically, the body 110 has a foot support 111 arranged at the bottom thereof, which is configured for connecting rotatably with the foot assembly 120. The foot assembly 120 comprises a foot body 121, two foot locks 122 and two foot locking covers 123. The foot body 121 is typically set as an H-shape support, and the central horizontal portion thereof is a foot handle 124 for being held conveniently to rotate the whole foot assembly 120. Typically, an antiskid pad 102 is arranged at the bottom of the foot body such that the whole rack is not easy to slide when it is placed on the working platform. The foot support 111 has two foot shaft apertures 125 arranged symmetrically thereon, and the foot body 121 has two foot locking holes 126 arranged thereon which correspond to the foot shaft apertures 125. A projecting cylinder 127 is arranged on the foot locks 122. The projecting cylinder 127 passes through the foot shaft apertures 125 and the foot locking holes 126 to interference fit with the foot locking covers 123, such that the foot body 121 is rotatably connected with the foot support 111. If pulling the foot handle 124, a torque is produced on the foot body 121 to adjust the inclined angle of the foot body 121 relative to the body 110, such that the inclined angle of the slide-rail 200 on the body 110 is adjustable. Thus it is convenient for the user to choose the force-direction which is suitable for the user when he holds the vegetable or the fruit slides on the slide-rail 200. When the foot body 121 rotates to the horizontal, the shape of the foot body 121 flushes the bottom of the body 110.

Typically, a support positioning device is arranged between the foot assembly 120 and the rack 100 to position the foot assembly 120 at a predetermined angle relative to the rack 100. In detail, the foot positioning device comprises an elastic positioning convex 131 arranged on the cylindrical surface of the projecting cylinder 127, positioning slots 132, 133 arranged in the corresponding locations of the foot shaft apertures 125 and the foot locking holes 126. At least two positioning slots 133*a* and 133*b* are arranged in the hole wall of the foot locking holes 126, a positioning slot 132 is arranged in the hole wall of the foot shaft apertures 125, and the diameter of the foot locking holes 126 is larger than the that of the foot shaft apertures 125. A flexible piece 134 is arranged on the cylindrical surface of the projecting cylinder 127 of the foot locks 122, and the elastic positioning convex 131 is arranged on the flexible piece 134. When the projecting cylinder 127 of the foot locks 122 is inserted into the foot locking holes 126 and the foot shaft apertures 125, the positioning slot 132 of the elastic positioning convex 131 and the foot shaft apertures 125 fits with the positioning slot 133*a* of the foot locking holes 126. At this moment, the foot body 121 is retracted into the bottom of the rack 100. That is, it is parallel to the bottom of the rack 100. When holding the foot handle 124 of the foot body 121 and pulling the foot body 121, the foot body 121 rotates around the axis of the foot shaft holes 125. At this moment, the hole wall of the foot locking holes 126 pulls the elastic positioning convex 131 of the foot locks 122 out of the positioning slot 133*a* of the foot locking holes 126 to the hole wall of the foot locking holes 126. Since the diameter of the foot locking holes 126 is larger than that of the foot shaft apertures 125, the elastic positioning convex 131 is still cooperated with the positioning slot 132 of the foot shaft apertures 125 at this moment. That is, the foot locks 122 are unmoved relative to the foot shaft apertures 125 and rotate relative to the foot body 121. When the another positioning slot 133*b* in the hole wall of the foot locking holes 126 rotates to a same straight line with the positioning slot 132 in the hole wall of the foot shaft apertures 125, the another positioning slot 133*b* in the hole wall of the foot locking holes 126 is cooperated with the elastic positioning convex 131 such that the whole foot body 121 is positioned at another location. A plurality of positioning slots may be arranged in the hole wall of the foot locking holes 126 in actual need, such that the foot body 121 may be positioned at a plurality of different locations.

In the preferred embodiment of the present invention, the body 110 is a frame structure, and comprises a left side-plate 112 and a right side-plate 113 arranged at the left and right sides thereof respectively. The left side-plate 112 and the right side-plate 113 are connected through a transom 114. The slide-rail 200 is arranged between the left side-plate 112 and the right side-plate 113 and on the transom 114. A platform 210 is arranged upon the slide-rail 200 and between the left side-plate 112 and the right side-plate 113. An escalating device 500 is arranged under the platform 210 to control the action of up or down of the platform 210. A switch slot 118 is arranged in the right side-plate 113, and a side cover 115 is arranged on the side of the switch slot 118 for shielding the switch slot 118.

As shown in FIGS. 1, 4, 4*a* and 5, the escalating device 500 comprises an eccentric cam assembly 510 and a knob 520. In a preferable exemplary embodiment, the escalating device 500 may comprises two eccentric cam assemblies 510, and the two eccentric cam assemblies 510 rotate synchronously by a synchronizer 530. Thus the user may rotate the knob 520 to rotate the eccentric cam assemblies 510, such that the platform 210 moves up or down. In detail, the platform 210 extends downward and comprises left and right block-plates 211, 212 extending therefrom. The left and right block-plates 211, 212 have platform active holes 213 formed therein. Each of the eccentric cam assemblies 510 has a controlling shaft 511, and the controlling shaft 511 has eccentric cams 512 fixed thereon and cooperated with the two platform active holes 213 of the platform 210. Typically, the eccentric cams are integrated with the platform control shaft, and the peak of the major axis of the eccentric cams is same to the circumference position of the platform controlling axis. The rack 100 has a shaft-hole 116, such that the platform controlling axis may be arranged rotatably in the rack 100. One terminal of one of the platform controlling axis passes through the rack 100 and the shaft-holes 116*a*, 116*b*, 116*c* arranged in the side cover 115 extend out of the rack 100 and cooperate with the knob 520. That is, the knob 520 is fixed on the extending terminal of the platform control axis. When the knob 520 drives the platform controlling axis to rotate, the eccentric cams 512 of the platform controlling axis rotate in the platform active holes 213, to move up or down the platform 210. Since the two eccentric cams cooperated with each other and the platform active holes 213 are arranged between the platform 210 and the platform controlling axis, and are arranged at the left and right sides respectively, the platform 210 will not be inclined when the platform 210 moves up or down.

Figure 4:
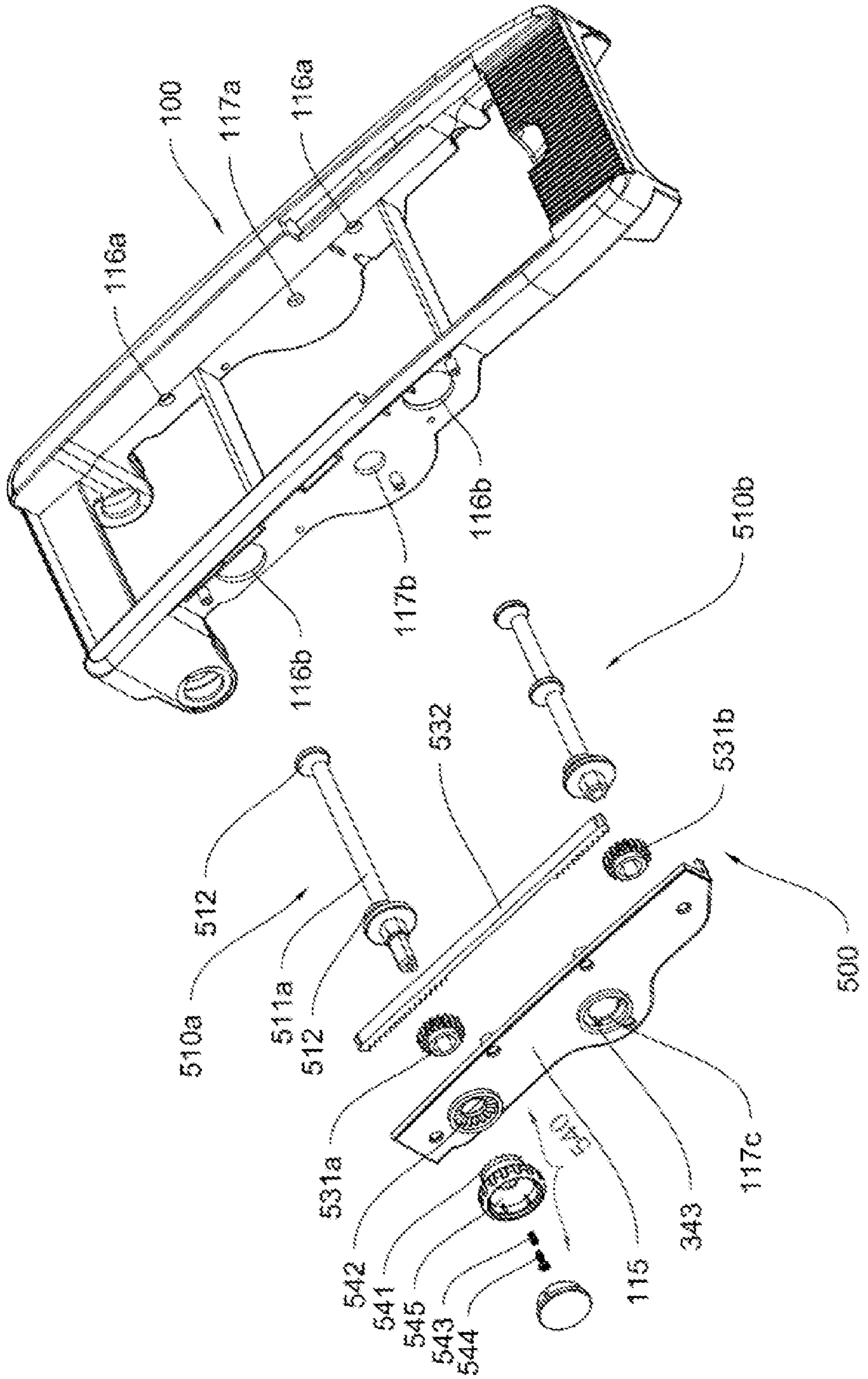
FIG. 4 is a structure schematic view of an escalating device of a vegetable and fruit cutting device according to a preferred embodiment of the present invention.
Figure 4A:
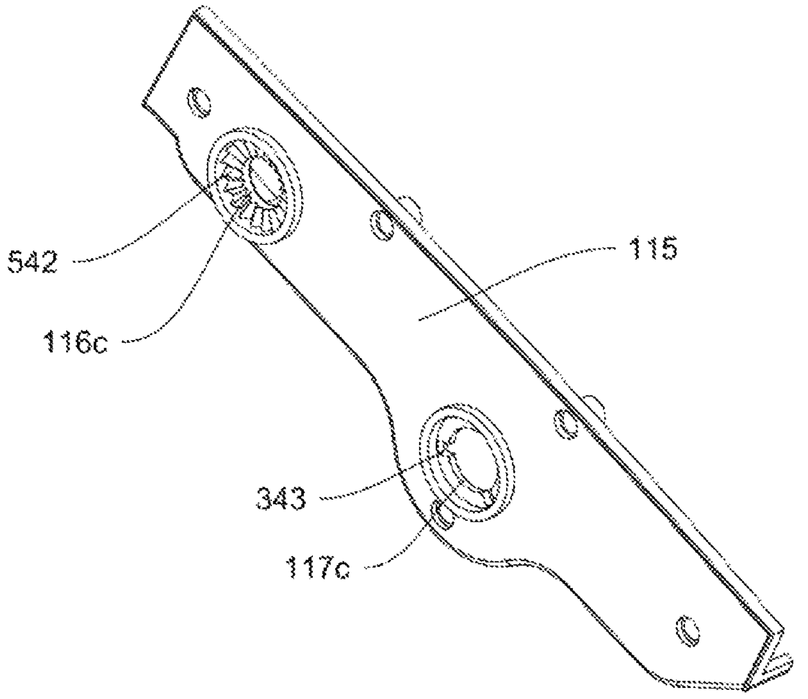
FIG. 4*a* is a structure schematic view of a side cover of a vegetable and fruit cutting device according to a preferred embodiment of the present invention.

As shown in FIGS. 4 and 4*a*, the synchronizer 530 comprises synchronized gears 531*a*, 531*b* arranged at the same terminal of the two platform controlling shaft, and a rack 532 arranged slideably in the switch slot 118. The rack 532 engages with the two synchronized gears 531*a*, 531*b*, and the two synchronized gears 531*a*, 531*b* are arranged at the terminal of the corresponding platform controlling shaft and rotate synchronously with the platform controlling shaft 511*a*, 511*b*. The knob 520 cooperates with one of the platform controlling shaft. When the knob 520 drives the platform controlling shaft 511*a* to rotate, the synchronization gear 531*a* of the platform controlling shaft 511*a* drives the rack 532 to slide, and the rack 532 drives the other synchronization gear 531*b* to rotate. Then another platform controlling shaft 511*b* is driven to rotate, thus the two eccentric cam assemblies 510*a* and 510*b* rotate synchronously. The two eccentric cam assemblies 510 are disposed at the front and back locations below the platform 210 respectively. Typically, the angle locations of the peaks of the major axis of the eccentric cams 512*a* and 512*b* are same, to ensure moving up or down the front and back portions of the platform 210 consistently. Since the eccentric cam assemblies 510 are disposed at the front and back portions under the platform 210, such that the front and back portions of the whole platform can move up or down synchronously during the up-down moving process. Furthermore, it also can disperse the pressures of the platform 210 relative to the eccentric cam assemblies 510, reduce the attrition, and ensure the location precision of the platform 210 relative to the serrated-blade assembly 300.

For preventing the platform 210 from moving down automatically during the using process, typically, a positioning device 540 is disposed between the knob 520 and the eccentric cam assembly 510. The positioning device 540 is mainly performed by a contrite gear group which elastically engages. The positioning device 540 comprises a driven gear 541, a fixed gear 542, a first spring 543 and a first fixed bolt 544. An extending terminal is arranged at the platform controlling shaft 511 out of the rack 100 and is cooperated with the shaft-hole 116*c* of the side cover 115. Typically, the fixed gear 542 is disposed at a side of the shaft-hole 116*c* toward the rack 100, and the driven gear 541 is disposed at an end face of the knob 520 adjacent to an end of the rack 100. A spring seat 545 is disposed at another terminal of the knob. The first fixed bolt 544 is disposed at the extending terminal of the platform controlling shaft 511*a*, and the first spring 543 is set at the end of the platform controlling shaft 511*a* and disposed between the spring seat 545 of the knob and the first fixed bolt 544. When the knob 520 rotates, the driven gear 541 of the knob and the fixed gear 542 of the side cover break from engaging, and the tooth crests of the contrite gear group contact, to push the knob 520 to move a little in a direction far away from the rack 100. After rotating a certain angle, the driven gear 541 and the fixed gear 542 engage with each other again, and the knob 520 resets by the spring action of the first spring 543. Thus the driven gear 541 attaches the fixed gear 542, to position the platform controlling shaft 511*a* at a new rotation position. The present invention can position the platform controlling shaft 511*a* at different rotation positions, thus the platform 210 can be positioned at different horizontal heights and will not alter the distance from the rack 100 by the pressure of cutting the vegetable or the fruit. Therefore, it can ensure the correct position of the platform 210 relative to the serrated-blade assembly 300 and the consistency of cut vegetable or fruit.

Figure 5:
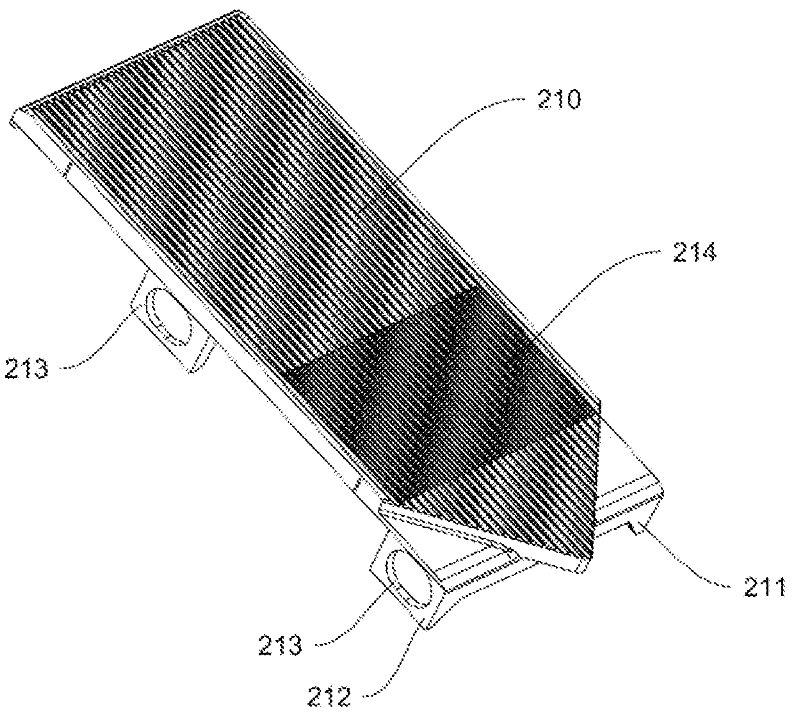
FIG. 5 is a structure schematic view of a moveable board of a vegetable and fruit cutting device according to a preferred embodiment of the present invention.
Figure 6:
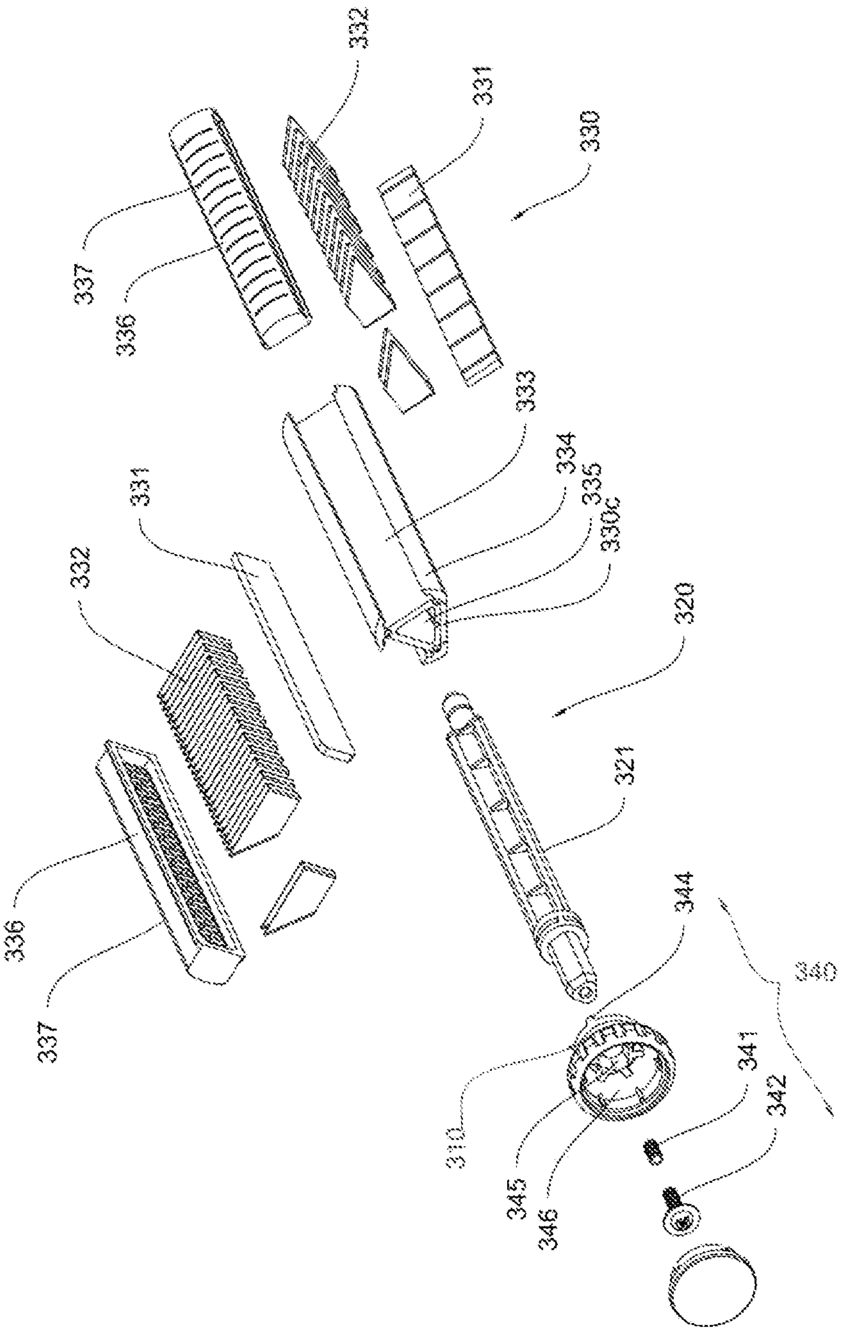
FIG. 6 is an exploded schematic view of a rotating blade assembly of a vegetable and fruit cutting device according to a preferred embodiment of the present invention.
Figure 7:
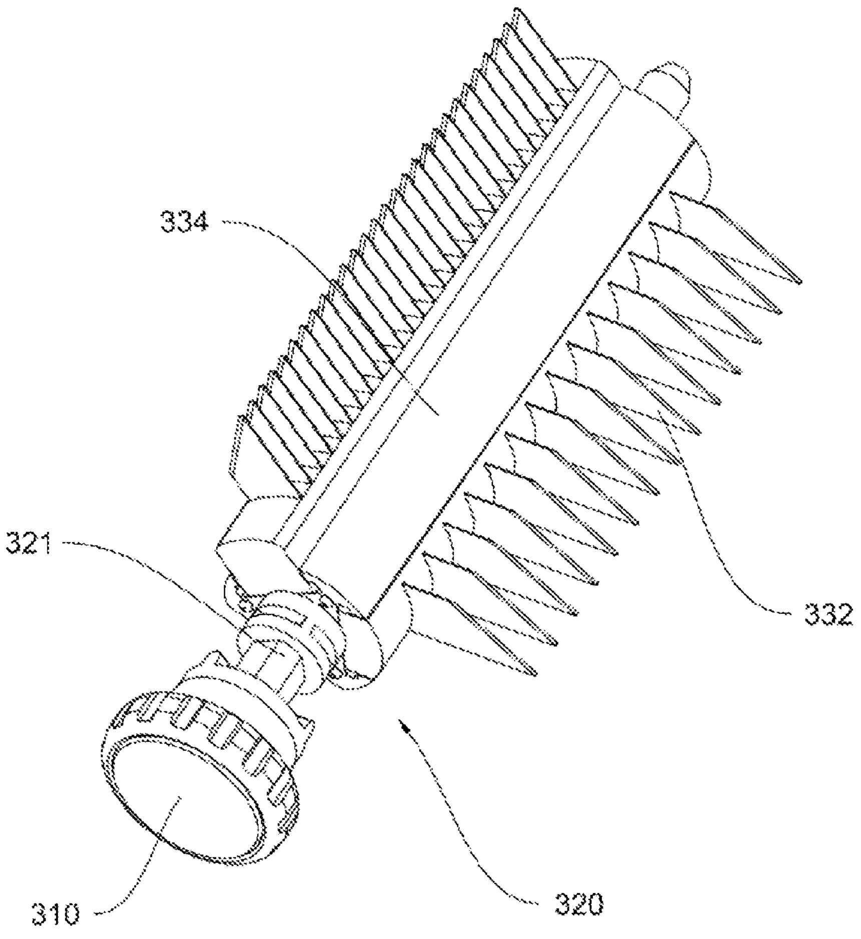
FIG. 7 is a structure schematic view of the rotating blade assembly of a vegetable and fruit cutting device according to a preferred embodiment of the present invention.

As shown in FIGS. 5, 6, and 7, the serrated-blade assembly 300 is disposed rotatably below the platform 210, and blade aperture 214 is disposed on the platform 210 such that the serrated-blades 332 of the serrated-blade assembly 300 can pass through the blade aperture 214 above the platform 210, that is reaching the slide-rail 200. When the vegetable or the fruit slides the blade aperture 214 along the platform 210, the serrated-blades 332 of the serrated-blade assembly 300 can cut the vegetable or the fruit with the equal space, and cooperate the flat-blade assembly 400 to cut vegetable or fruit into strips. In detail, the serrated-blade assembly 300 comprises a blade device 320 arranged rotatably on the rack 100 and under the platform 210, and a blade knob 310 for driving the blade device 320 to rotate. The blade device 320 comprises a blade connecting shaft 321 and a blade assembly 330. The rack 100 has blade connecting shaft-holes 117 for disposing rotatably the blade connecting shaft 321 on the rack 100. An end of the blade connecting shaft 321 passes through the blade connecting shaft-holes 117*a*, 117*b*, 117*c* arranged on the rack 100 and the side cover 115, and extends out of a side of the rack 100. The blade knob 310 is fixedly set on the extending end of the blade connecting shaft 321. It can rotate the blade knob 310 at the side of the rack to rotate the blade connecting shaft 321 for driving the blade assembly 330 arranged on the blade connecting shaft to rotate, such that the serrated-blades 332 of the blade assembly stick out of the blade aperture 214 of the platform, or take back from the blade aperture 214 to the platform.

Typically, the blade assembly 330 comprises a serrated-blade sheath 336, a serrated-blade base 331 and a plurality of serrated-blades 332 fixed at a same side of the serrated-blade base 331. Each of the serrated-blades 332 is perpendicularly fixed on a side of the serrated-blade base 331. Typically, every two adjacent serrated-blades have a same distance therebetween, to cut the vegetable or the fruit into uniform strips. The serrated-blade sheath 336 has a plurality of through holes 337 therein which match the serrated-blades for being passed through by the serrated blade 332. The serrated-blade base 331 is embedded in the bottom of the serrated-blade sheath 336, and the side of the serrated-blade base 331 having the serrated-blades 332 is adjacent to the serrated-blade sheath 336, such that the serrated-blades 332 are disposed between the serrated-blade sheath 336 and the serrated-blade base 331. Therefore, the serrated-blades 332 are fixed firmly and can be replaced according to the need. An installation slot 333 is disposed in a side of the blade connecting shaft 321 along the axis. The shape of the serrated-blade sheath 336 matches the installation slot 333. The serrated-blade sheath 336 can pass through the end surface of the blade connecting shaft 321 to insert the installation slot 333, such that the serrated-blade base 331 is fixed on the side of the blade connecting shaft 321. In detail, it is better to set a sleeve 334 in the outside of the blade connecting shaft 321, and a central axis-hole 335 is disposed in the center of the sleeve 334 and matches the blade connecting shaft 321. The central axis-hole 335 is polygon or irregular-shape that matches the sectional shape of the blade connecting shaft 321, such that the sleeve 334 can rotate synchronously with the blade connecting shaft 321. The installation slot 333 is disposed in the side of the sleeve 334, to dispose the blade assembly 330 on the sleeve 334, for easily processing the installation slot 333. In an alternative exemplary embodiment, the installation slot 333 still can be directly disposed in the side of the blade connecting shaft 321. In a preferable exemplary embodiment, the blade device 320 has a plurality of blade assemblies 330 disposed thereon, and the serrated-blades 332 of each of the blade assemblies have different heights. In detail, a plurality of installation slots 333 matching the amount of the blade assemblies 330 are disposed in the side of the sleeve 334, thus the blade assemblies 330 can be inserted into the installation slots 333 respectively. Typically, the plurality of installation slots 333 are disposed circumference uniformly in the side of the sleeve 334. When rotating the blade knob 310 to rotate the blade connecting shaft 321, it can select one of the blade assemblies 330 having the serrated-blades with the different height to pass through the blade aperture 214 of the platform, for cutting the vegetable or the fruit sliding on the slide-rail 200 with different depths, and then cooperating the flat-blade assembly 400 to cut the vegetable or the fruit with different thicknesses.

For positioning the different blade assemblies 330 in the blade aperture 214 of the platform, a changing-blade and positioning mechanism 340 is typically disposed between the rack 100 and the blade knob 310. The blade connecting shaft 321 passes through the blade connecting shaft-holes 117 disposed in the side cover 115 of the side of the rack 100 and extends out of the rack 100. The changing-blade and positioning mechanism 340 comprises a second spring 341, a second screw 342, a positioning slot 343 disposed in the side cover 115, and positioning convex 344 disposed on the blade knob 310, and the positioning convex 344 may cooperate with the positioning slots 343. Typically, a connecting hole 345 is disposed in the blade knob 310 and cooperates with the extending end of the blade connecting shaft 321. The extending end of the blade connecting shaft 321 is polygon, and the connecting hole 345 of the blade knob 310 matches the shape of the extending end of the blade connecting shaft 321, thus the blade knob 310 can be fixed at the end of the blade connecting shaft 321 and can be limited to rotate circumferentially relative to the blade connecting shaft 321. The positioning convex 344 are disposed on the end of the blade knob 310 adjacent to the rack, and a spring seat 346 is disposed on another end thereof. The amount of the positioning convex 344 are equal to that of the blade assemblies, and the circumferential locations of the positioning convex on the blade knob 310 and the locations of the installation slots 333 of the blade connecting shaft 321 are arranged at a same straight line. The positioning slots 343 are disposed around the blade connecting shaft-holes 117 of the side cover 115, and match the positioning convex 344. The second screw 342 is disposed on the extending end of the blade connecting shaft 321, and the second spring 341 is set on the end of the blade connecting shaft 321 and between the spring seat 346 and the second screw 342 of the blade knob 310. In use, the blade knob 310 is pulled out in the horizontal direction from the side of the rack 100, to make the positioning convex 344 break away from the positioning slot 343. Then the blade knob 310 rotates until the positioning convex 344 cooperates with another positioning slot 343. The blade knob 310 compresses tightly on the side cover 115 by the elastic force of the second spring 341. At this moment, the blade connecting shaft 321 cannot continuous to rotate, and the corresponding blade device assembly 320 sticks out of the blade hole 214, to reliably position the serrated-blade assembly 300.

Typically, the serrated-blade assembly 300 has a blade assembly 330*c* without the serrated-blades 332. That is, the blade assembly 330*c* only has the serrated-blade sheath 336 and does not have the serrated-blades and the serrated-blade base. When the blade assembly 330*c* is corresponding to the blade aperture 214 of the platform 210, that is, the blade assembly 330*c* reaches under the blade aperture 214, no serrated-blade is on the platform 210, and the vegetable or the fruit will not be cut and directly slide to the flat-blade assembly 400 when it slides on the slide-rail 200, to produce the slices of the cut vegetable or fruit.

According to the above description, the serrated-blades 332 of the blade assembly 330 are exposed under the bottom of the rack 100. For protecting the serrated-blades 332 from damaging and preventing the serrated-blades 332 from hurting hand during the process of transportation and use, a protection cover or cover 101 is typically disposed on the bottom of the rack 100. The protection cover or cover 101 is rotatably disposed on the rack 100 and under the serrated-blade assembly 300, to cover the whole serrated-blade assembly 300.

Figure 8:
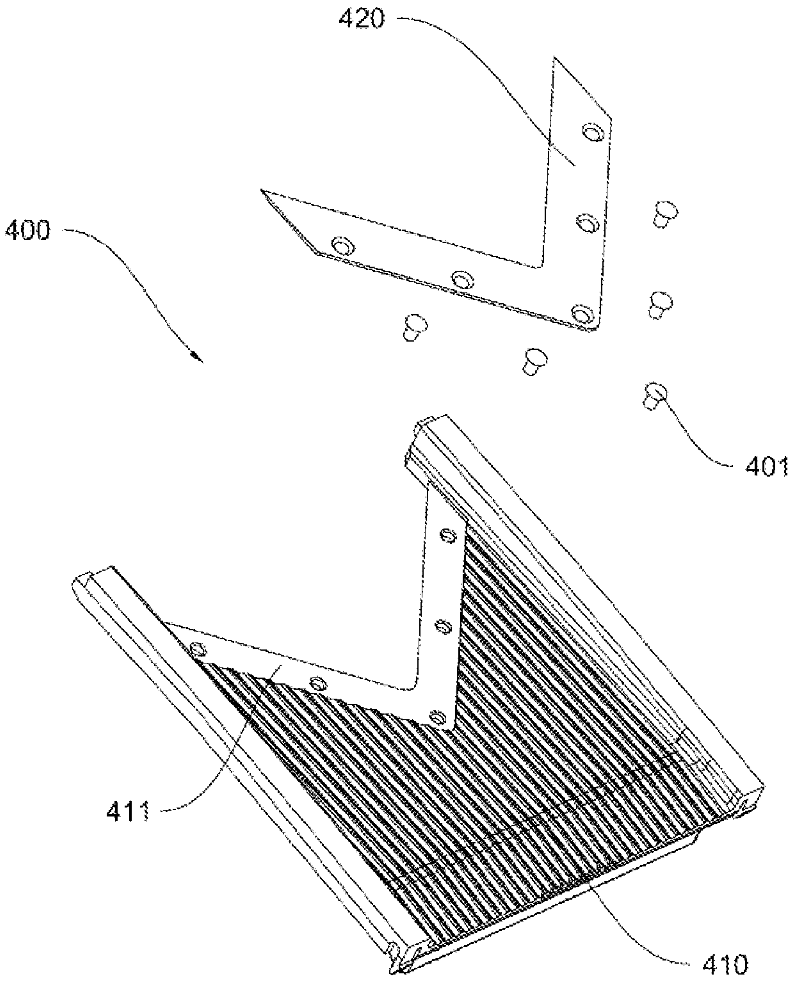
FIG. 8 is a structure schematic view of a flat-blade assembly of a vegetable and fruit cutting device according to a preferred embodiment of the present invention.

As shown in FIGS. 1 and 8, the flat-blade assembly 400 is disposed at the front end of the slide-rail 200 of the rack 100. The flat-blade assembly 400 comprises a flat-blade board 410 and a flat blade 420. The flat blade 420 is fixed at a side of the cutter point 411 of the flat blade 420 by the fastener, such as the screw 401 etc. The cutter point 411 of the flat-blade board is a side edge of the flat-blade board 410 adjacent to the back end of the rack 100. The flat blade 420 is typically V-shape, and the cutter point 411 of the flat-blade board is also V-shape corresponding to the shape of the flat blade 420. The flat-blade board 410 is disposed in the slide-rail 200 of the rack 100, thus the vegetable or the fruit are cut horizontally when it passes through the flat-blade assembly 400.

Figure 2:
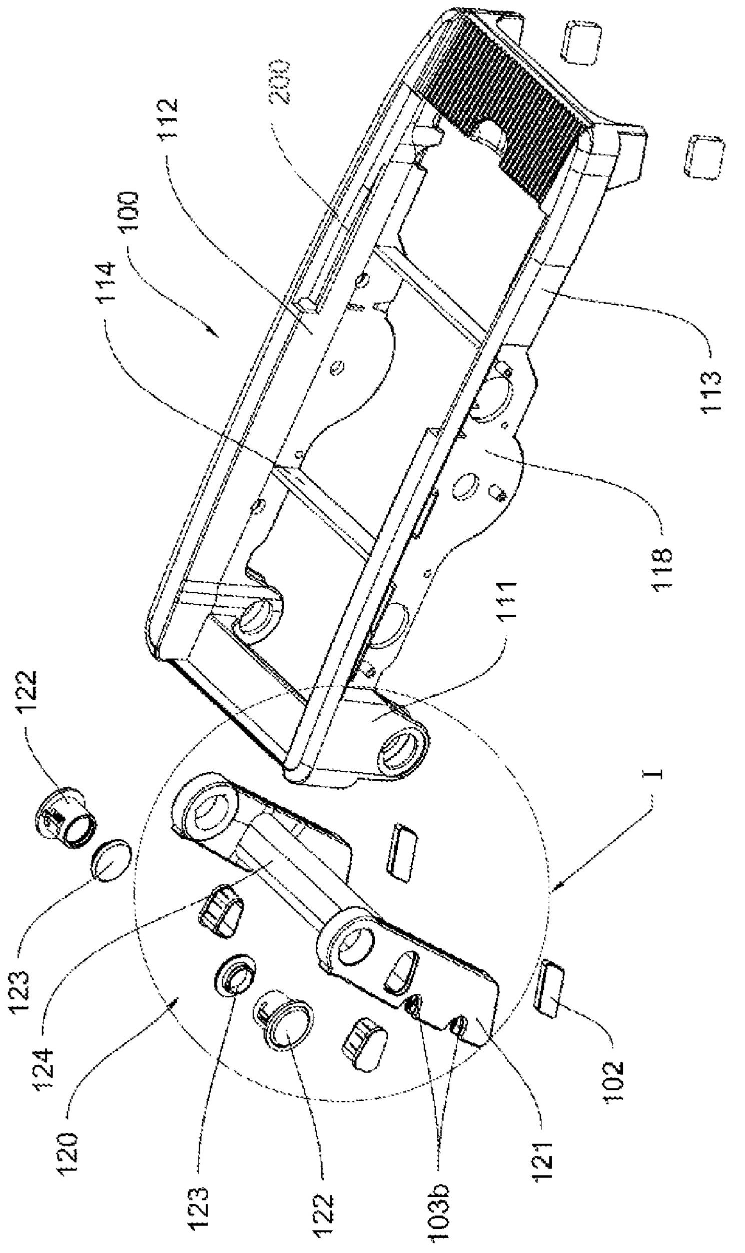
FIG. 2 is an exploded schematic view of a rack of a vegetable and fruit cutting device according to a preferred embodiment of the present invention.
Figure 2A:
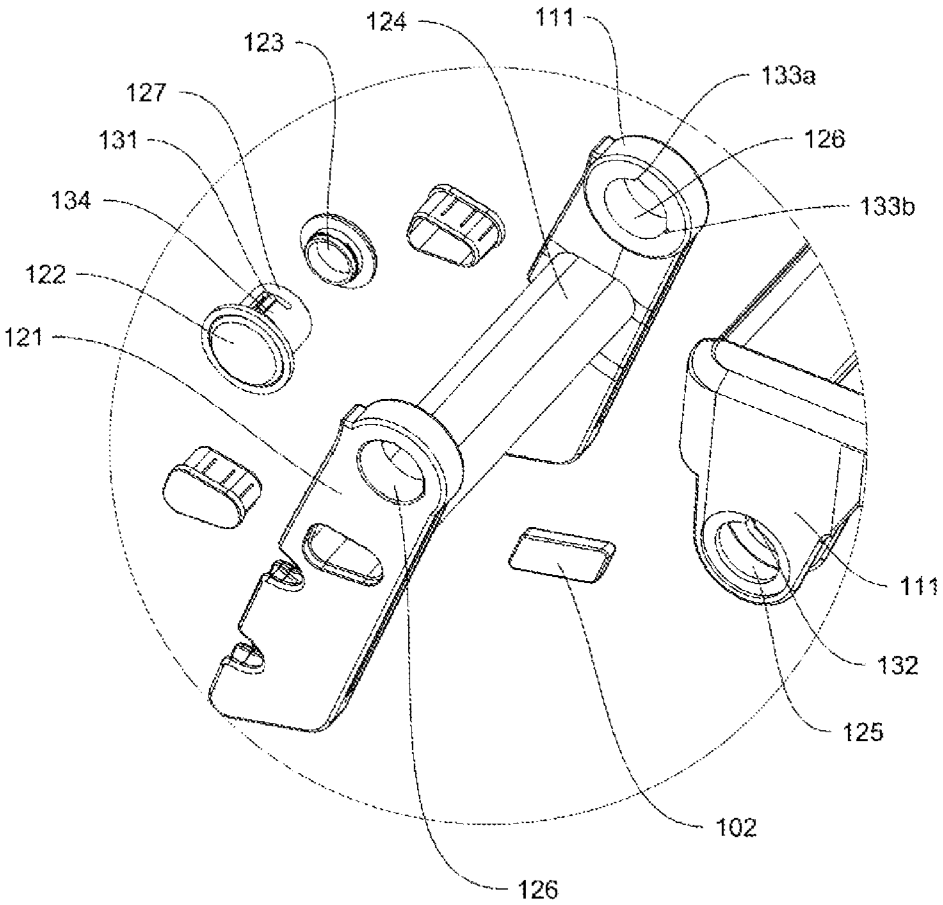
FIG. 2*a* is a partial-enlarged schematic view of I as shown in FIG. 2.
Figure 3:
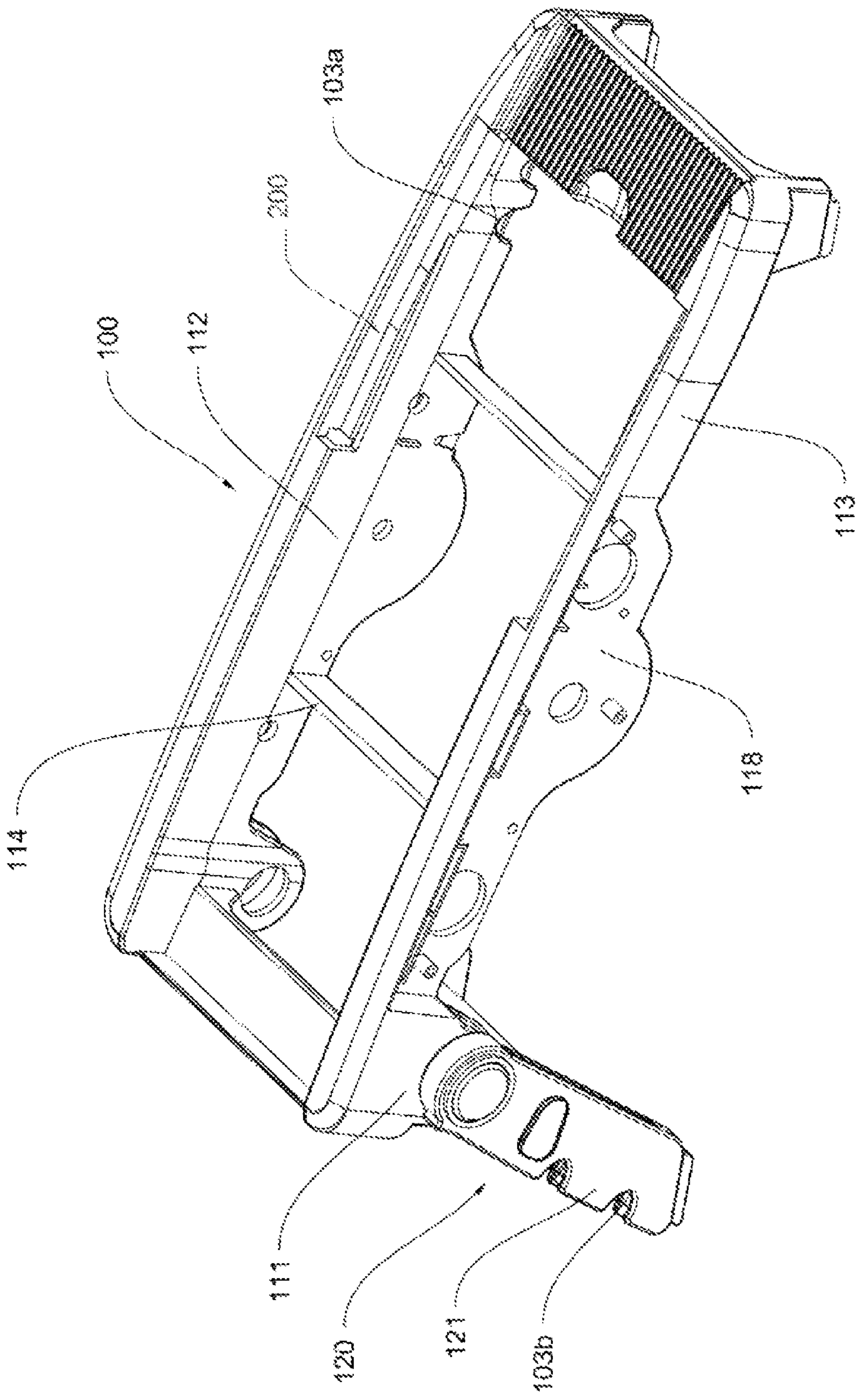
FIG. 3 is a structure schematic view of a rack of a vegetable and fruit cutting device according to a preferred embodiment of the present invention.

As shown in FIGS. 1 and 2, in a preferable exemplary embodiment, concave members 103*a* and 103*b* are disposed at the bottom of the body and the foot body. When the whole vegetable and fruit cutting device is placed on the opening of the container configured for collecting the cut vegetable or fruit, the concave members are corresponding to the opening of the container such that the whole rack can be blocked at the opening of the container for reliably positioning. Typically, the concave member 103*a* of the body and the concave member 103*b* of the foot body are disposed at the two side of the cutter point 411 of the flat-blade board respectively, such that the cut vegetable or fruit fall into the container.

The above described implementation example only demonstrates several implementation methods of this practical new type. The description is concrete and detailed. But it should not be understood as the limit of the patent scope of this practical new type. It should point out that for the common technicians of this field, they can make several changes and improvements on the condition that the conception and design of this practical new type is followed.

What is claimed is:

1. A vegetable and fruit cutting device comprising:

a rack;

a slide-rail mounted on the rack and adapted for moving vertically;

a platform mounted on the slide-rail;

a serrated-blade assembly;

a flat-blade assembly;

an escalating device for vertically moving the platform;

wherein the escalating device includes:

two eccentric cam assemblies mounted below the platform being synchronously rotated by a synchronizer to lift or lower the platform vertically;

each eccentric cam assembly comprising two eccentric cams and two holes on a bottom of the platform, said eccentric cams are rotatably mounted in the holes respectively;

the synchronizer comprising two synchronization gears and a gear rack;

a knob mounted to one side of the rack adapted for driving the eccentric cam assemblies;

the serrated-blade assembly rotatably offset under the platform; and a blade aperture for receiving a serrated-blade of the serrated-blade assembly is provided on platform serrated blades.

2. The vegetable and fruit cutting device as in claim 1, wherein the synchronizer has two synchronized gears disposed at a same end of the two controlling shafts of the two eccentric cam assemblies, and the gear rack engaged with the two synchronized gears is provided on the rack.

3. The vegetable and fruit cutting device as in claim 1, wherein a position device is mounted between the knob and the controlling shaft, the positioning device includes a driven gear mounted to a side of an end face of the knob, a fixed gear mounted on the rack, a first spring sleeved on an end of the controlling shaft which is projecting from the rack, and a first fixed bolt for positioning the first spring between the knob and the end of the controlling shaft.

4. The vegetable and fruit cutting device as in claim 1, wherein the serrated-blade assembly includes a blade device rotatably provided on the rack, and a blade knob provided on an end of the blade device for controlling the rotation of the blade device.

5. The vegetable and fruit cutting device as in claim 4, wherein the blade device includes a blade connecting shaft rotatably set on the rack and one end of said connecting shaft is projecting from a side of the rack, and a blade assembly provided on the blade connecting shaft, the blade knob is sleeved on an end of the connecting shaft which is projecting from the rack.

6. The vegetable and fruit cutting device as in claim 5, wherein an axial installing slot is provided on a side of the blade connecting shaft, the blade assembly includes a serrated-blade base that matching with the axial installing slot, and a plurality of serrated-blades radially provided on one side of the serrated-blade base along the blade connecting shaft; the serrated blade is matching with a second aperture of the platform.

7. The vegetable and fruit cutting device as in claim 6, wherein at least two sets of blades are provided on the blade connecting shaft, and a blade-replacing positioning device is provided between the blade knob and the rack adapted for positioning the blade shaft such that one set of the blades is passing through a blade aperture to extend to the upside of the platform.

8. The vegetable and fruit cutting device as in claim 7, wherein the blade connecting shaft is rotatably mounted on the rack through a shaft aperture, the blade-replacing positioning device includes a positioning tenon provided on a side of an end face of the blade knob that corresponds to the position of the blade assembly mounted on the blade shaft, at least one positioning slot that matches with a positioning convex is provided around the shaft aperture, a spring sleeved on an end of the blade connecting shaft which is projecting from the rack, and a fixed bolt for positioning the second spring between the blade knob and the end of the connecting shaft.

9. The vegetable and fruit cutting device as in claim 1, wherein the rack includes a body and a foot assembly that is rotatably mounted on the bottom of the back-end of the body, at least one foot support is provided on the bottom of the back-end of the body; the foot assembly includes a foot body and a locking device for rotatably connecting the foot body with the foot support.

10. The vegetable and fruit cutting device as in claim 9, wherein two foot shaft apertures are symmetrically set on the foot support, and two foot locking holes are set on the foot body and corresponding with the two foot shaft apertures, said locking device is provided with corresponding foot shaft aperture and foot locking hole; the locking device includes a cylinder, an elongated foot lock adapted to pass through the foot shaft aperture and foot locking hole, and a foot locking cover fastened on the elongated foot lock.

11. The vegetable and fruit cutting device as in claim 10, wherein a foot positioning device for securing the foot assembly with predetermined angle is provided between the foot assembly and the rack, the foot positioning device includes an elastic bulge and a retaining nest that provided between the cylinder and the side walls of the foot shaft aperture and the foot locking hole.

12. The vegetable and fruit cutting device as in claim 9, wherein a concave member adapted for receiving the opening of a container for storing the cut vegetable or fruit is positioned below the rack body and the foot body.

13. The vegetable and fruit cutting device as in claim 1, wherein a cover for protecting the serrated-blade assembly is rotatably set on the bottom of the rack and under the serrated-blade assembly.

* * * * *